United States Patent [19]

Shiraki et al.

[11] Patent Number: 4,792,584

[45] Date of Patent: Dec. 20, 1988

[54] ADHESIVE COMPOSITIONS

[75] Inventors: Toshinori Shiraki, Yamato; Yasuo Hattori; Masao Karouji, both of Yokohama, all of Japan

[73] Assignee: Asahi Kasei Kogyo Kabushiki Kaisha, Osaka, Japan

[21] Appl. No.: 41,403

[22] Filed: Apr. 23, 1987

[30] Foreign Application Priority Data

May 2, 1986 [JP] Japan .................................. 61-101133
Jul. 21, 1986 [JP] Japan .................................. 61-169792

[51] Int. Cl.$^4$ ............................................. C08K 5/13
[52] U.S. Cl. ................................. 524/77; 524/100; 524/108; 524/271; 524/274; 524/348; 524/482; 524/485; 524/484; 525/92; 525/97; 525/98
[58] Field of Search .................. 525/98, 92, 97; 524/77, 524/274, 291, 108, 348, 100, 482, 483, 484, 271; 526/340, 336; 428/355, 200

[56] References Cited

U.S. PATENT DOCUMENTS

| | | | |
|---|---|---|---|
| 4,292,414 | 9/1981 | Saito et al. | 525/255 |
| 4,429,076 | 1/1984 | Saito et al. | 525/301 |
| 4,628,072 | 12/1986 | Shipaki et al. | 525/57 |
| 4,657,970 | 4/1987 | Shiraki et al. | 525/57 |
| 4,657,971 | 4/1987 | Shiraki et al. | 525/57 |
| 4,732,928 | 3/1988 | Mizushiro et al. | 524/505 |

Primary Examiner—Veronica P. Hoke
Attorney, Agent, or Firm—Birch, Stewart, Kolasch & Birch

[57] ABSTRACT

An adhesive composition comprising
  100 parts by weight of a block copolymer (a) containing of at least one polymer block composed mainly of a vinyl aromatic hydrocarbon and at least one polymer block composed mainly of butadiene in which
  (i) the vinyl aromatic hydrocarbon content [S] is 10 to 30% by weight,
  (ii) the 1,2-vinyl content of butadiene portion [V] is 20 to 50%, and
  (iii) the relationship between said vinyl aromatic hydrocarbon content [S] and said 1,2-vinyl content of butadiene portion [V] satisfies the formula,:

$$40 \leq [S] + [V] \leq 70$$

40 to 200 parts by weight of a tackifier (b), and, optionally
various stabilizers, and a process for producing said composition.

22 Claims, No Drawings

ADHESIVE COMPOSITIONS

FIELD OF THE INVENTION

The present invention relates to adhesive compositions which have excellent initial tack, adhesive strength and creep resistance and also possesses an improved treatment capabilities at high-temperature. The present invention further provides compositions which are suitable for adhesive tapes, labels, etc.

RELATED ART STATEMENT

Adhesives have heretofore been used for various purposes. For example, adhesives have been used in adhesive tapes and labels. To coat an adhesive onto tapes, generally a method is employed which comprises dissolving the adhesive in a solvent to form an adhesive solution and coating a substrate with the adhesive solution by means, such as roll coating or spray. However, the employment of such solvents involves a multitude of problems from the standpoint of air pollution, fire, work environment and hygiene, etc., and in recent years, this has come to be regarded as a serious social problem. As a means for eliminating such problems, as recently noticed, non-solvent type hot-melt adhesives have been used.

As base polymers of hot-melt adhesives, various polymers have been used, polymers such as ethylene-vinyl acetate copolymers, block copolymers of conjugated dienes and vinyl aromatic hydrocarbons, ethylene-α-olefin copolymers, and polyester resins. In particular, block copolymers are preferred because of their relatively favorable balance between adhesive properties and creep resistance. For example, Japanese Patent Publication Nos. 17037/69 and 41518/70 disclose adhesive compositions using a linear-chain block copolymer such as polystyrene-polybutadiene-polystyrene or polystyrenepolyisoprene-polystyrene. Japanese Patent Publication No. 49958/81 discloses a hot-melt adhesive composition using a branched-chain block copolymer (polystyrene-polybutadiene)$_n$X.

However, block copolymers of styrene and butadiene are insufficient in initial tack. Therefore, as base polymers for adhesive tapes and labels in which sufficient initial tack is particularly required, block copolymers of styrene and isoprene which have excellent initial tack, have often been used recently. But, in the case of adhesive compositions which comprises block copolymers of styrene and isoprene, when allowed to stand at high temperatures for a long period of time, would result in a cleavage of the molecular chain, the cleavage being caused by heat degradation. Consequently, the viscosity and the physical properties have been changed. Therefore, it is desirable to improve the initial tack of styrene-butadiene block copolymers which undergo no cleavage of the molecular chain. Various researches have heretofore been conducted on improving the initial tack of the styrene-butadiene block copolymers. For example, Japanese Patent Publication No. 20972/79 discloses a method using a hydrogenated aromatic petroleum resin as a tackifier. The tackifier had been prepared by hydrogenating a petroleum resin obtained by polymerization of a petroleum distillate comprising a polymerizable aromatic hydrocarbon as its main constituent. The ratio of hydrogenated aromatic ring in the aromatic component had been adjusted to 40 to 80%. Japanese Patent Application Kokai (Laid-Open) No. 2375/82 discloses a method using a hydrogenated resin having a softening point of 50° to 160° C. The hydrogenated resin had been prepared by removing most of the vinyl-norbornane, which was a main product, by distillation thereof from a reaction mixture. The reaction mixture was produced by a Diels-Alder reaction of 1,3-butadiene with cyclopentadiene. The thus obtained distillate having a dicyclopentadiene concentration of 10 to 70% and a concentration of tetrahydroindene and/or vinyl-cyclohexene of 30 to 80% was subjected to copolymerization by heating the distillate at 220° to 320° C., and hydrogenating the resin thus obtained. However, the initial tack is still not sufficiently improved even by such methods. Accordingly, there is a desire to seek further improvement in this area.

OBJECT AND SUMMARY OF THE INVENTION

In consideration of such conditions, the present inventors have devoted themselves to research directed toward improving the initial tack of an adhesive composition containing a block copolymer of butadiene and vinyl aromatic hydrocarbon. Consequently, the present inventors have found that improved initial tack can be achieved by the use of a block copolymer of butadiene and vinyl aromatic hydrocarbon in which the vinyl aromatic hydrocarbon content of the block copolymer and its 1,2-vinyl content of butadiene portion are in specific ratios, which would specify the relationship between the two.

Further, the present inventors have found that the treatment capabilities at a high temperature can be further improved by incorporating into the composition comprising the above-mentioned specified block copolymer, a specific phenolic compound or the combination of a specific phenolic compound and a sulfur-containing stabilizer.

More particularly, the present invention relates to an adhesive composition comprising 100 parts by weight of a block copolymer (a) containing at least one polymer block composed mainly of a vinyl aromatic hydrocarbon and at least one polymer block composed mainly of butadiene in which (i) the vinyl aromatic hydrocarbon content [S] is 10 to 30% by weight, (ii) the 1,2-vinyl content of butadiene portion [V] is 20 to 50%, and (iii) the relationship between said vinyl aromatic hydrocarbon content [S] and said 1,2-vinyl content of butadiene portion [V] satisfies the formula:

$$40 \leq [S] + [V] \leq 70$$

and 40 to 200 parts by weight of a tackifier (b).

Further, the present invention relates to an adhesive composition obtained by incorporating into the adhesive composition comprising the above-mentioned components (a) and (b), 0.05 to 5 parts by weight of at least one member of a phenolic compounds (c) represented by the general formulae [I] and [II] selected from the group consisting of

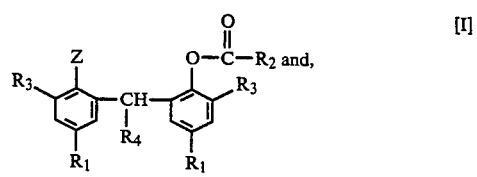

-continued

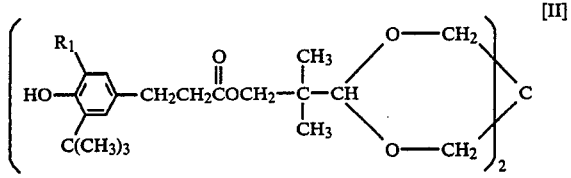

wherein Z is OH or

$R_1$ is an alkyl group having 1 to 4 carbon atoms, $R_2$ is an alkenyl group having 2 to 4 carbon atoms, $R_3$ is a tert-butyl group or a cyclohexyl group, and $R_4$ is a hydrogen atom or an alkyl group having 1 to 18 carbon atoms.

Yet further, the present invention relates to an adhesive composition obtained by further incorporating into the composition comprising the above-mentioned components (a), (b) and (c), 0.05 to 5 parts by weight of an sulfur-containing stabilizer (d).

The compositions of the present invention are excellent not only in initial tack, adhesive strength and creep resistance, but also in treatment capabilities at a high temperature. For example, the compositions being characterized with the stability of adhesive properties, melt viscosity and the like to heating at high temperatures or heating for a long period of time, enables the compositions to be suitably utilized as hot-melt adhesives.

In the specification, the term "parts" is given in parts by weight of each component per 100 parts by weight of the block copolymer (a) unless specified.

The term "vinyl aromatic hydrocarbon content [S]" is expressed in percent(s) by weight of said content per weight of said block copolymer (a), and the term "1,2-vinyl content of butadiene portion [V]" is given in a ratio by weight or a molar ratio of the butadiene units bonded in the form of 1,2-vinyl structure to the total butadiene units in said block copolymer (a) which corresponds to the total of butadiene units bounded in the form of both 1,4-structure and 1,2-vinyl structure therein. Said ratio can be calculated by determining 1,2-vinyl content in the butadiene portion using an infrared spectrometer, NMR apparatus or the like.

DETAILED DESCRIPTION OF PREFERRED EMBODIMENTS

The block copolymer as component (a) used in the present invention contains at least one, preferably two or more polymer blocks composed mainly of a vinyl aromatic hydrocarbon and at least one polymer block composed mainly of butadiene. The term "polymer block composed mainly of a vinyl aromatic hydrocarbon" used herein means a copolymer block of a vinyl aromatic hydrocarbon and butadiene having a vinyl aromatic hydrocarbon content of 50% by weight or more, and/or a vinyl aromatic hydrocarbon homopolymer block. The term "polymer block composed mainly of butadiene" used herein means a copolymer block of butadiene and a vinyl aromatic hydrocarbon having a butadiene content of more than 50% by weight, and/or a butadiene homopolymer block. The vinyl aromatic hydrocarbon in the copolymer blocks may be distributed either uniformly or taperingly. A plurality of portions wherein the vinyl aromatic hydrocarbon is uniformly distributed and/or a plurality of portions wherein the vinyl aromatic hydrocarbon is taperingly distributed may coexist in each block.

The vinyl aromatic hydrocarbon content [S] of the block copolymer as component (a) used in this invention is 10 to 30% by weight, preferably 15 to 25% by weight, and the 1,2-vinyl content of butadiene portion [V] is 20 to 50%, preferably 25 to 45%. When the vinyl aromatic hydrocarbon content is less than 10% by weight, the creep resistance is low, and when it exceeds 30% by weight, the initial tack is insufficient. When the 1,2-vinyl content of butadiene portion is outside the above range, the initial tack is insufficient. The block copolymer as component (a) used in this invention is preferably one in which the relationship between [S] and [V] satisfies the formula:

$$40 \leq [S] + [V] \leq 70$$

particularly preferably $$45 \leq [S] + [V] \leq 60$$

When [S]+[V] is outside the above range, a composition being excellent in balance among initial tack, adhesive strength and creep resistance, cannot be obtained.

The vinyl aromatic hydrocarbon used in this invention includes styrene, o-methylstyrene, p-methylstyrene, p-tert-butylstyrene, 1,3-dimethylstyrene, α-methylstyrene, vinylnaphthalene, vinylanthracene, etc., with styrene being the most preferred. These compounds may be used either alone or as a mixture thereof.

As a process for producing the block copolymer used in the present invention, there are exemplified well-known processes. For example, such processes are disclosed in Japanese Patent Publication Nos: 19286/61, 24915/65, 17979/68, 31951/70, 32415/71, 14132/72, etc., but with the vinyl aromatic hydrocarbon content [S] and the 1,2-vinyl content of butadiene portion [V] being in the ranges specified for the present invention. The 1,2-vinyl content can be adjusted by controlling the type and amount of a polar compound used as a vinyl modifier, the polymerization temperature, and the like in a polymerization method which comprises carrying out the polymerization in a hydrocarbon solvent by using an organolithium compound as the initiator.

As the hydrocarbon solvent, there can be used, for example, aliphatic hydrocarbons, such as butane, pentane, hexane, isopentane, heptane, octane, isooctane, and the like; alicyclic hydrocarbons such as cyclopentane, methylcyclopentane, cyclohexane, methylcyclohexane, ethylcyclohexane, and the like; and aromatic hydrocarbons such as benzene, toluene, ethylbenzene, xylene, and the like. The organolithium catalyst includes, organomonolithium compounds, organodilithium compounds, organopolylithium compounds, etc. Specific examples of these compounds include, ethyl lithium, n-propyl lithium, isopropyl lithium, n-butyl lithium, sec-butyl lithium, tert-butyl lithium, hexamethylene dilithium, butadienyl dilithium, isoprenyl dilithium, etc. The polar compound includes ethers, such as tetrahydrofuran, diethylene glycol dimethyl ether, diethylene glycol dibutyl ether and the like, amines such as triethylamine, tetramethylethylenediamine and the like, thioethers, phosphines, phosphoramides, alkylbenzenesulfonates, alkoxides of potassium and sodium, etc.

In the present invention, there can be used block copolymers whose polymer structures are represented by the general formula:

(A—B)$_n$, A—(B—A)$_n$, or B—(A—B)$_n$ (wherein A is a polymer block composed mainly of a vinyl aromatic hydrocarbon; B is a polymer block composed mainly of butadiene; the boundary between the blocks A and B need not necessarily be clear; and n is an integer of 1 or more), or by the general formulae:

[(B—A)$_n$]$_{m+1}$X, [(A—B)$_n$]$_{m+1}$X

[(B—A)$_n$B]$_{m+1}$X, [(A—B)$_n$A]$_{m+1}$X (wherein A and B have the same meanings as defined above; X is a residue of a coupling agent such as silicon tetrachloride, tin tetrachloride, epoxidized soybean oil or the like, or a residue of an initiator such as polyfunctional organolithium compounds or the like; and each of m and n is an integer of 1 or more). Optionally, a mixture of block copolymers represented by the above general formulas may be used as component (a).

As the block copolymer used in this invention, those having a number average molecular weight of 10,000 to 500,000 can be used, and those having a melt flow (temperature 200° C., load 5 kg) of 0.5 to 50 g/10 min, preferably 1 to 30 g/10 min are suitable. When the melt flow is less than 0.5 g/10 min, the viscosity of the resulting adhesive composition is increased, so that the coating operation on tapes and the like tends to be difficult. When the melt flow exceeds 50 g/10 min, the creep resistance tends to be poor.

When the adhesive composition of this invention is particularly required to have high creep resistance, it is preferable to use a block copolymer which comprises at least two polymer blocks composed mainly of a vinyl aromatic hydrocarbon and at least one polymer block composed mainly of butadiene and in which all the ends of the polymer chains are polymer blocks composed mainly of a vinyl aromatic hydrocarbon.

When the adhesive composition of this invention is particularly required to have high initial tack, it is preferable to use a block copolymer which comprises at least one polymer block composed mainly of a vinyl aromatic hydrocarbon and at least one polymer block composed mainly of butadiene and in which at least one end of the polymer chains is a polymer block composed mainly of butadiene.

Further, when there is required a composition especially excellent in balance between creep resistance and initial tack, it is recommended to use a mixture of 100 parts by weight of the former block copolymer which is excellent in creep resistance and 3 to 100 parts by weight, preferably 5 to 80 parts by weight of the latter block copolymer which is excellent in initial tack.

In the adhesive compositions of the present invention, there can be used a block copolymer in which an atomic group containing polar-group is attached to at least one of the ends of the polymer chains of the block copolymer as component (a) specified in the present invention. The creep resistance of the adhesive composition can be improved by attaching an atomic group containing polar group to the end of polymer chain. The term "atomic group containing polar group" used herein means an atomic group containing at least one atom selected from the group consisting of nitrogen, oxygen, silicon, phosphorus, sulfur and tin. Specific examples of the atomic group containing polar-group include atomic groups containing at least one polar group selected from the group consisting of carboxyl group, carbonyl group, thiocarbonyl group, acid halide groups, acid anhydride groups, carboxylic acid groups, thiocarboxylic acid groups, aldehyde groups, thioaldehyde groups, carboxylic acid ester groups, amide groups, sulfonic acid group, sulfonic acid ester groups, phosphoric acid group, phosphoric acid ester groups, amino group, imino group, nitrile group, pyridyl group, quinoline group, epoxy group, thioepoxy group, sulfide group, isocyanate groups, isothiocyanate groups, silicon halide groups, alkoxy silicon groups, tin halide groups, alkyl tin groups, phenyl tin groups, etc. More specifically, there can be used, as component (a), terminally modified vinyl aromatic hydrocarbon-butadiene block copolymers having a vinyl aromatic hydrocarbon content and a 1,2-vinyl content of butadiene portion in the ranges specified in this invention, among the terminally modified block copolymers described in Japanese Patent Application No. 224806/85. The tackifier as component (b) used in this invention is one which has heretofore been used as tackifier in hot-melt adhesives and the like, and it includes, for example, coumarone-indene resin, phenolic resins, p-tert-butylphenol-acetylene resins, phenolformaldehyde resins, terpene-phenol resins, polyterpene resins, xylene-formaldehyde resins, synthetic polyterpene resins, aromatic hydrocarbon resins, aliphatic cyclic hydrocarbon resins, oligomers of monoolefins and diolefins, hydrogenated hydrocarbon resins, hydrocarbon resins, polybutene, polyhydric alcohol esters of rosin, hydrogenated rosin, hydrogenated wood rosin, esters of hydrogenated rosin and monohydric alcohols or polyhydric alcohols, turpentine series tackifier. More specifically, there can be used the tackifier described in "Rubber and Plastic Compounding Agents edited by Rubber Digest Co., Ltd.". Particularly suitable tackifiers are terpene resins, aromatic-compound-modified terpene resins, alicyclic saturated petroleum resins, rosin esters, disproportionated rosin esters, completely hydrogenated rosin esters, aliphatic petroleum resins (C$_5$-aliphatic petroleum resins, C$_5$, C$_9$-aliphatic-/aromatic petroleum resins, etc.), C$_9$-aromatic petroleum resins and modified aliphatic petroleum resins, and these tackifier give compositions good in initial tack.

In this invention, the tackifier as component (b) is used in an amount of 40 to 200 parts by weight, preferably 60 to 150 parts by weight per 100 parts by weight of the block copolymer as component (a). When the blending amount of the tackifier is outside the above range, the adhesive properties of adhesive tapes using the resulting adhesive compositions are unsatisfactory. Therefore, it is not desirable.

The adhesive compositions of this invention may be incorporated with phenolic stabilizers, sulfur-containing stabilizers, phosphorous-containing stabilizers, amine series stabilizers, etc. in order to impart thereto thermal stabilty at high temperatures. Particularly preferable stabilizers include the phenolic compounds of the above general formulas [I] or [II] (component (c)) and combinations of said component (c) and the sulfur-containing stabilizer (component (d)). In the phenolic compounds of the above general formulas [I] or [II], specific examples of the substituent R$_1$ include methyl group, ethyl group, propyl group, isopropyl group, butyl group, isobutyl group and tert-butyl group, although methyl group, isopropyl group or tert-butyl group is particularly preferred. The substituent $R_2$ is an alkenyl group having 2 to 4 carbon atoms and specific examples thereof include ethenyl group, isopropenyl group, propenyl group, isobutenyl group, butenyl group, etc. Among them, ethenyl group is particularly preferred. The substituent $R_3$ is preferably a tert-butyl group. Specific examples of the substituent $R_4$ include hydrogen atom, methyl group, ethyl group, propyl group and butyl group, though hydrogen atom and methyl group are particularly preferred. The phenolic compound as component (c) is used in an amount of 0.05 to 5 parts by weight, preferably 0.1 to 2 parts by weight per 100 parts by weight of the block copolymer as component (a). When the using amount of component (c) is less than 0.05 parts by weight, no improving effect on the treatment capabilities at a high temperature is brought about. On the other hand, even when it exceeds 5 parts by weight, the effect obtained is not larger than when the amount used is in the range specified in the present invention.

As the sulfur-containing stabilizer as component (d) used in the present invention, stabilizers commonly called "sulfur-containing stabilizers" among various stabilizers can be used. Specific examples thereof include dilauryl-3,3'-thiodipropionic acid esters, dimyristyl-3,3'-thiodipropionic acid esters, distearyl-3,3'-thiodipropionic acid esters, laurylstearyl-3,3'-thiodipropionic acid esters, ditridecyl-3,3'-thiodipropionic acid esters, compounds of the general formula [III] and [IV]:

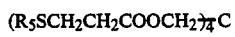

[III]

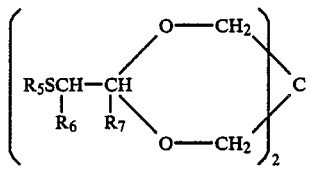

[IV]

(wherein $R_5$ is an alkyl group having 3 to 20 carbon atoms, specifically a hexyl group, an octyl group, a dodecyl group, an octadecyl group or the like, and is particularly preferably a dodecyl group; and each of $R_6$ and $R_7$ is a hydrogen atom or an alkyl group having 1 to 18 carbon atoms and is particularly preferably a hydrogen atom, a methyl group, an ethyl group, a propyl group or a butyl group), etc. Specific examples of the compounds of the general formula [III] or [IV] include pentaerythritoltetrakis-(laurylthiopropionate), 3,9-bis(2-dodecylthioethyl)-2,4,8,10-tetraoxaspiro[5.5]-undecane, and 3,9-bis(2-octadecylthiopropyl)-2,4,8,10-tetraoxaspiro[5.5]-undecane. The sulfur-containing compound as component (d) is used in an amount of 0.05 to 5 parts by weight, preferably 0.1 to 2 parts by weight per 100 parts by weight of the block copolymer as component (a). When the using amount of component (d) is less than 0.05 parts by weight, no improving effect on the treatment capabilities at a high temperature is brought about. On the other hand, over when it exceeds 5 parts by weight, the effect obtained is not larger than when the using amount is in the range specified in this invention. In the present invention, compounds selected from the compounds of the above general formulas [III] and [IV] are particularly preferred as the sulfur-containing compound.

In the present invention, in order to improve the treatment capabilities at a high temperature, at least one phenolic compound selected from the group consisting of the compounds of the general formulae [V], [VI], [VII] and [VIII] shown below can be used as component (e) in an amount of 0.05 to 5 parts by weight, preferably 0.1 to 2 parts by weight per 100 parts by weight of the block copolymer as component (a):

[V]

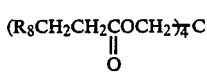

[VI]

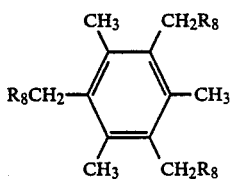

[VII]

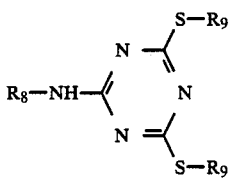

[VIII]

wherein $R_8$ is

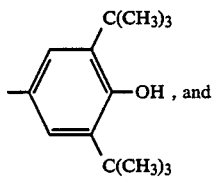

, and $R_9$ is an alkyl group having 2 to 22 carbon atoms.

In the above general formulas, the substituent $R_9$ is an alkyl group having 2 to 22 carbon atoms, preferably 4 to 20 carbon atoms. In particularly, the substituent $R_9$ is preferably an octadecyl group in the general formula [V] and an octyl group in the general formula [VIII].

In the present invention, if necessary, a phosphorus-containing stabilizer may be further incorporated in an amount of 0.05 to 5 parts by weight, preferably 0.1 to 2 parts by weight per 100 parts by weight of the block copolymer. Specific examples of the sulfur-containing stabilizer include tris(nonylphenyl)phosphite, cyclic neopentanetetraylbis(octadecylphosphite), tris(2,4-di-tert-butylphenyl)phosphite, 4,4-butylidene-bis(3-methyl-6-tert-butylphenyl-di-tridecyl)phosphite, tetrakis(2,4-di-tert-butylphenyl) 4,4'-biphenylenediphosphinate, cyclic neopentanetetraylbis(2,4-di-tert-butylphenyl phosphite, etc. A composition good in color tone can be obtained by incorporating such phosphorus-containing stabilizers.

As the amine series stabilizers, there can be exemplified, for example, diarylamine type stabilizers such as diphenylamine, N-phenyl-o-naphthylamine, N-phenyl-β-naphthylamine, butylated diphenylamine, styrenated diphenylamine, octylated diphenylamine, nonylated diphenylamine, and the like; alkylarylamine type stabilizers such as N-cyclohexylaniline, N-methylaniline, N-isopropylaniline, N-1,3-dimethylbutylaniline, N-(2-ethylhexyl)aniline, and the like; N,N'-diaryl-p- phenylenediamine type stabilizers such as N,N'-diphenyl-p-phenylenediamine, N,N'-diorthotolyl-p-phenylenediamine, N,N'-bis(2,4-xylyl)-p-phenylenediamine, N,N'-bistolyl-p-phenylenediamine, N,N'-ditolyl-p-phenylenediamine, N-tolyl-N'-xylyl-p-phenylenediamine, N,N'-dixylyl-p-phenylenediamine, N,N'-bis-8-naphthyl-p-phenylenediamine, and the like; N-aryl-p-phenylenediamine type stabilizers such as N-phenyl-p-phenylenediamine, N-tolyl-p-phenylenediamine, N-xylyl-p-phenylenediamine, and the like; N-aryl-N'-alkyl-p-phenylenediamine type stabilizers such as N-phenyl-N'-isopropyl-p-phenylenediamine, N-phenyl-N'-isobutyl-p-phenylenediamine, N-phenyl-N'-(1,3-dimethylbutyl)-p-phenylenediamine, N-phenyl-N'-cyclohexyl-p-phenylenediamine, N-phenyl-N'-octyl-p-phenylenediamine, and the like; N,N'-dialkyl-p-phenylenediamine type stabilizers such as N,N'-bis(1-methylheptyl)-p-phenylene diamine, N,N'-bis(1,4-dimethylpentyl)-p-phenylenediamine, N,N'-bis(1-ethyl-3-methylpentyl)-p-phenylenediamine, and the like; quinoline derivative type stabilizers such as 2,2,4-trimethyl-1,2-dihydroquinoline, 2,2,4-trimethyl-1,2-dihydroquinoline polymers, 6-ethoxy-2,2,4-trimethyl-1,2-dihydroquinoline, and the like; and condensation product type stabilizers such as dehydrating-condensation products of aldol-α-naphthylamine or diphenylamine and acetone, and the like. These stabilizers may be used alone or in proper combination of two or more of them.

In the present invention, if necessary, a softener (component (f)) may be used. The softener as component (f) includes petroleum softeners, paraffin, fatty oil softeners, thermoplasticizers, etc. Specifically, there can be used the softeners described in "Rubber and Plastic Compounding Agents" above. The softener as component (f) is used usually in an amount of 150 parts by weight or less, preferably 5 to 100 parts by weight per 100 parts by weight of the block copolymer as component (a). When the using amount exceeds 150 parts by weight, the creep resistance of adhesive tapes using the resulting adhesive composition is low. Therefore, it is not desirable.

In the present invention, the creep resistance and the hardness can be improved by incorporating, as reinforcing resin, polystyrenes, polyethylenes, polypropylenes, ethylene-propylene copolymers, ethylene-butene copolymers, ethylene-vinyl acetate copolymers, or thermoplastic resins such as relatively low-molecular-weight thermoplastic polyester resins, polyamide resins, polyphenylene ether resins and the like in an amount of 50 parts by weight or less, preferably 2 to 40 parts by weight, more preferably 5 to 30 parts by weight per 100 parts by weight of the block copolymer as component (a). When the blending amount of the reinforcing resin exceeds 50 parts by weight, the initial tack is lowered. Therefore, it is not desirable. The adhesive compositions of the present invention may be used in admixture with other ordinary elastomer, for example, natural rubber, synthetic polyisoprene rubber, polybutadiene rubber, styrene-butadiene rubber, chloroprene rubber, ethylene-propylene rubber, acrylic rubber, polyisopreneisobutylene rubber, polycyclopentene (polypentenamer), vinyl aromatic hydrocarbonconjugated diene block copolymers other than those specified in the present invention, etc., unless said adhesive compositions lose characteristics as adhesives.

EFFECTS OF THE INVENTION

Since the adhesive compositions of the present invention are excellent in initial tack, adhesive properties and creep resistance, they can be utilized in various adhesive tapes and labels, pressure-sensitive thin plates, pressure-sensitive sheets, various back pastes for fixing light-weight plastics molding, back pastes for fixing carpets, back pastes for fixing tiles, etc., and are effective particularly for use as adhesive tapes and labels. Furthermore, the adhesive compositions of the present invention can be used as adhesives for plastics, rubber-like materials, foams, metals, wood, paper products, etc.

EXAMPLES

Examples are shown below not as limits on the scope of this invention but as representatives of this invention.

EXAMPLES 1 TO 3 AND COMPARATIVE EXAMPLES 1 TO 7

Hot-melt adhesive compositions are produced by blending 100 parts by weight of each styrene-butadiene block copolymer having an A-B-A structure listed in Table 1 (whose molecular weight has been adjusted so as to adjust the melt flow to about 5 g/10 min) with 100 parts by weight of an aliphatic petroleum resin (Quintone U-185, mfd. by Nippon Zeon Co., Ltd.) as tackifier, 30 parts by weight of a naphthenic process oil (Sonic Process Oil R-200, mfd. by Kyodo Petroleum Co., Ltd.), and 1 part by weight of 2,2'-methylenebis(6-tert-butyl-4-methylphenol) monoacrylate (hereinafter referred to as AO-1). In Comparative Example 7, a styrene-isoprene block copolymer is used as block copolymer.

Kraft adhesive tapes are produced by coating each of thus produced adhesive compositions on Kraft paper subjected to back treatment, and are subjected to the following performance assessments. The initial tack is evaluated in the following manner according to J. Dow method [Proc. Inst. Rub. Ind., 1. 105 (1954)]. Each adhesive tape of 10 cm in length is attached to a slope on a stainless-steel plate inclining at an angle of 30°, after which stainless-steel balls of 32 sizes in the diameter range of ⅛ inch to 1 inch are individually rolled down the slope at an initial speed of zero from a position on the slope 10 cm above the upper end of the tape, and the initial tack is expressed in terms of the size of a ball having the largest diameter among balls which stopped on the adhesive tape. The adhesive strength is measured according to JIS Z-1522 by attaching each adhesive tape having a width of 25 mm and a length of 100 mm to a stainless-steel plate, and peeling off the same at an angle of 180° at a speed of 300 mm/min at 23° C. The creep resistance is evaluated according to JIS Z-1524 by attaching each adhesive tape to a stainless-steel plate so as to adjust the contacted area to 25 mm × 25 mm, applying thereto a load of 1 kg at 60° C., and measuring the time required for the adhesive tape to be slipped down.

The results obtained are shown in Table 1 and indicate that the adhesive compositions in the ranges specified in this invention have satisfactory initial tack, adhesive strength, and creep resistance.

TABLE 1

| | Block copolymer used | | | | | |
|---|---|---|---|---|---|---|
| | Styrene content [S] (wt. %) | 1,2-Vinyl content [V] (%) | [S] + [V] | Ball tack (No.) | Adhesive strength (g/cm) | Creep resistance (min.) |
| Example | | | | | | |
| 1 | 20 | 33 | 53 | 21 | 800 | 165 |
| 2 | 25 | 30 | 55 | 19 | 760 | 220 |
| 3 | 17 | 40 | 57 | 20 | 880 | 90 |
| Comparative Example | | | | | | |
| 1 | 20 | 11 | 33 | 16 | 740 | 50 |
| 2 | 20 | 60 | 80 | <3 | 610 | 755 |
| 3 | 5 | 33 | 38 | 24 | 1020 | <20 |
| 4 | 40 | 33 | 73 | 8 | 760 | 420 |
| 5 | 30 | 50 | 80 | 7 | 730 | 500 |
| 6 | 10 | 20 | 30 | 19 | 930 | <20 |
| 7 | SIS (Note 1) | | | 21 | 700 | 56 |

Note 1: styrene-isoprene block copolymer (K-1107, mfd. by Shell Chemical Co.)

EXAMPLES 4 TO 14 AND COMPARATIVE EXAMPLES 8 TO 11

Adhesive compositions are produced in the same manner as in Example 1, except that each of the stabilizers listed in Table 2 and Table 3 is incorporated in place of AO-1, and their adhesive properties and melt viscosity after heating in air at 180° C. for 48° C. are measured.

As is evident from Table 2 and Table 3, the adhesive compositions of this invention showed satisfactory adhesive properties even after heating at a high temperature for a long period of time, and had such a low melt viscosity that they had excellent processability when used for producing an adhesive tape or label.

When the adhesive composition of Comparative Example 7 is heated in air at 180° C. for 48 hours, after which its melt viscosity and adhesive properties are measured, it showed a ball tack of 23, an adhesive strength of 530 g/cm and a creep resistance of less than 20 minutes. Thus, the adhesive strength and the creep resistance are lowered. Moreover, the melt viscosity is as low as 2,000 poise as compared with the viscosity before the heating of 7,000 poise. Thus, the adhesive composition of Comparative Example 7 underwent a marked viscosity change and hence was poor in stability of processability.

TABLE 2

| | Example | | | | | Comparative Example | |
|---|---|---|---|---|---|---|---|
| | 4 | 5 | 6 | 7 | 8 | 8 | 9 |
| Blending amount of stabilizer (Note 2) | | | | | | | |
| AO-1 | 1 | 1 | 1 | 0.2 | 2 | | |
| AO-2 | | 0.5 | | 0.5 | | 0.5 | |
| AO-3 | | | 0.25 | | 0.2 | | |
| AO-4 | | | 0.25 | | | | |
| AO-5 | | | | 0.5 | | | |
| AO-6 | 0.5 | 0.5 | | 0.5 | | 0.5 | 0.5 |
| AO-7 | | | 0.5 | | 0.5 | | |
| AO-8 | | | | | | 1 | 1 |
| AO-9 | | | | | | | 0.5 |
| Melt viscosity (Note 3) (poise) | 8500 | 6400 | 7100 | 7900 | 6000 | >10000 | >10000 |
| Ball tack (No.) | 17 | 19 | 19 | 18 | 21 | 10 | 13 |
| Adhesive strength (g/cm) | 710 | 750 | 740 | 740 | 780 | 680 | 700 |
| Creep resistance (min) | 130 | 140 | 150 | 135 | 160 | 105 | 110 |

TABLE 3

| | Example | | | | | | Comparative Example | |
|---|---|---|---|---|---|---|---|---|
| | 9 | 10 | 11 | 12 | 13 | 14 | 10 | 11 |
| Blending amount of phenolic compound, etc. (Note 2) | | | | | | | | |
| AO-1 | 0.5 | | | | 0.2 | 2 | | |
| AO-10 | | | | | 1.0 | 0.2 | | |
| AO-11 | | 0.5 | | | | | | |
| AO-12 | | | 0.5 | | | | | |
| AO-13 | | | | 0.5 | | | | 0.01 |
| AO-14 | 0.5 | 0.5 | 0.5 | 0.5 | | | 0.01 | 0.5 |
| AO-9 | | | | | | 0.2 | | |
| AO-6 | | | 0.5 | | | | | |
| AO-7 | | | | | 0.5 | | | |
| AO-8 | | | | | | | 1.0 | |
| AO-2 | | | 0.5 | | | | | |
| AO-4 | | | | | 0.5 | | | |
| AO-5 | | | | 0.5 | | | | |
| Melt viscosity (Note 3) (poise) | 7500 | 8400 | 8000 | 9000 | 8100 | 6100 | >10000 | >10000 |
| Ball tack (No.) | 18 | 17 | 18 | 16 | 18 | 21 | A large amount of a gel-like substance was produced, so that the adhesive properties could not be evaluated. | |
| Adhesive strength (g/cm) | 730 | 710 | 735 | 700 | 730 | 750 | | |
| Creep resistance (min) | 140 | 130 | 135 | 120 | 130 | 160 | | |

Note 2: There is shown a blending amount (parts by weight) per 100 parts by weight of the block copolymer. The following compounds are used as the stabilizers.

AO-2: n-octadecyl-3-(3',5'-di-tert-butyl-4'-hydroxyphenyl) propionate

AO-3: tetrakis-[methylene-3-(3',5'-di-tert-butyl-4'-hydroxyphenyl) propionate]methane AO-4: 1,3,5-trimethyl-2,4,6-tris(3,5-di-tert-butyl-4-hydroxybenzyl)benzene AO-5: 2,4-bis(n-octylthio)-6-(4-hydroxy-3,5-di-tert-butylanilino)-1,3,5-triazine
AO-6: tris(nonylphenyl)phosphite
AO-7: tris(2,4-di-tert-butylphenyl)phosphate
AO-8: 2,6-di-tert-butyl-4-methylphenol
AO-9: distearyl 3,3'-thiodipropionate
AO-10: a sulfur-containing stabilizer of the above general formula [IV] in which $R_5$ is a dodecyl group and each of $R_6$ and $R_7$ is a hydrogen atom.
AO-11: a phenolic compound of the above general formula [I] in which Z is OH, each of $R_1$ and $R_3$ is a tert-butyl group, $R_2$ is an ethenyl group, and $R_4$ is a methyl group.
AO-12: a phenolic compound of the above general formula [I] in which Z is

$R_1$ is a methyl group, $R_2$ is an ethenyl group, $R_3$ is a tert-butyl group, and $R_4$ is a hydrogen atom.
AO-13: a phenolic compound of the above general formula [II] in which $R_1$ is a methyl group.
AO-14: a sulfur-containing compound of the above general formula [III] in which $R_5$ is a dodecyl group.

Note 3: measured at 180° C. by means of a Brookfield type viscometer.

EXAMPLES 15 TO 17

Adhesive compositions are produced in the same manner as in Examples 1 to 3, except that 1.0 parts by weight of AO-1 and 0.5 part by weight of AO-10 are used as stabilizers. Their performance characteristics are tabulated in Table 4.

TABLE 4

| | Block copolymer used | | | | | |
|---|---|---|---|---|---|---|
| | Styrene content [S] (wt. %) | 1,2-Vinyl content [V] (%) | [S] + [V] | Ball tack (No.) | Adhesive strength (g/cm) | Creep resistance (min.) |
| Example | | | | | | |
| 15 | 20 | 33 | 53 | 20 | 810 | 165 |
| 16 | 25 | 30 | 55 | 19 | 775 | 220 |
| 17 | 17 | 40 | 57 | 20 | 890 | 95 |

EXAMPLES 18 AND 19 AND COMPARATIVE EXAMPLES 12 AND 13

Adhesive compositions are produced in the same manner as in Example 1, except that the blending amounts of the tackifier and the softener are changed as shown in Table 5 and that 1 part by weight of AO-1, 0.5 part by weight of AO-3 and 0.5 part by weight of AO-6 are used as stabilizers. Their performance characteristics are evaluated. The results obtained are shown in Table 5.

TABLE 5

| | Blending amount tackifier (parts by weight) | Blending amount of softener (parts by weight) | Ball tack (No.) | Adhesive strength (g/cm) | Creep resistance (min.) |
|---|---|---|---|---|---|
| Example 18 | 150 | 60 | 24 | 680 | 120 |
| Example 19 | 70 | 20 | 17 | 850 | 250 |
| Comparative Example 12 | 250 | 30 | <3 | Kraft paper was broken | 30 |
| Comparative Example 13 | 20 | 30 | <3 | <300 | 25 |

EXAMPLES 20 AND 21

Adhesive compositions are produced in the same manner as in Example 1, except that the blending amounts of the tackifier and the softener are changed as shown in Table 6 and that in each composition, there are used 0.5 part by weight of AO-1 as phenolic compound, 0.5 part by weight of AO-14 as sulfur-containing stabilizer, 0.5 part by weight of AO-3 as another phenolic compound, and 0.5 part by weight of AO-6 as phosphorus-containing stabilizer. Their performance characteristics are evaluated. The results obtained are shown in Table.

TABLE 6

| | Blending amount tackifier (parts by weight) | Blending amount of softener (parts by weight) | Ball tack (No.) | Adhesive strength (g/cm) | Creep resistance (min.) |
|---|---|---|---|---|---|
| Example 20 | 150 | 60 | 24 | 700 | 130 |
| Example 21 | 70 | 20 | 17 | 860 | 255 |

EXAMPLES 22 TO 24

Adhesive compositions are produced according to the recipes shown in Table 7, and their performance characteristics are evaluated. With 100 parts by weight of each block copolymer are blended 100 parts by weight of each tackifier shown in Table 7, 30 parts by weight of a softener (Sonic process Oil R-200), 0.5 part by weight of AO-1, 0.3 part by weight of AO-13, and 0.5 part by weight of AO-14.

TABLE 7

| | Block copolymer used | | | | | | | |
|---|---|---|---|---|---|---|---|---|
| | Polymer structure | Styrene content [S] (wt. %) | 1,2-Vinyl content [V] (%) | [S] + [V] | Tackifier used | Ball tack (No.) | Adhesive strength (g/cm) | Creep resistance (min.) |
| Example 22 | BABAB | 25 | 43 | 68 | Aromatic-compound-modified terprene resin (Note 4) | 19 | 710 | 150 |
| Example 23 | (A—B)$_x$Si (Note 5) | 25 | 25 | 50 | Alicyclic saturated petroleum resin (Note 6) | 17 | 730 | 120 |
| Example 24 | BABA | 16 | 27 | 42 | Modified aliphatic petroleum resin | 21 | 760 | 90 |

TABLE 7-continued

| Polymer structure | Block copolymer used | | | Tackifier used | Ball tack (No.) | Adhesive strength (g/cm) | Creep resistance (min.) |
| --- | --- | --- | --- | --- | --- | --- | --- |
| | Styrene content [S] (wt. %) | 1,2-Vinyl content [V] (%) | [S] + [V] | | | | |
| | | | | (Note 7) | | | |

Note 4: YS-resin TO-105 (mfd. by Yasuhara Yushi Co., Ltd.) is used.

Note 5: There is used a block copolymer in which about 5% by weight of styrene is taperingly bonded to butadiene in the portion B. The number of tapers was 2.

Note 6: Arkon M-90 (mfd. by Arakawa Chemical Co., Ltd.) is used.

Note 7: ECR 316 (mfd. by Exxon Chemical Co., Ltd.) is used.

EXAMPLE 25

A hot-melt adhesive composition is produced by blending 100 parts by weight of a block copolymer composed of a blend of the block copolymer used in Example 1 and 20% by weight of a block copolymer of an A-B structure having a styrene content of 20% by weight and a 1,2-vinyl content of 33% with 100 parts by weight of Quintone U-185, 30 parts by weight of Sonic Process Oil R-200, 1 part by weight of AO-1, 0.5 part by weight of AO-10 and 0.5 part by weight of AO-9. Performance characteristics of the adhesive composition are evaluated to find that it had a ball tack of 23, an adhesive strength of 850 g/cm, and a creep resistance of 170 minutes. Thus, a composition having a further improved initial tack could be obtained by blending the block polymer having an A-B structure.

EXAMPLE 26

A terminally modified block copolymer having an N-methylpyrrolidone reacted residue attached to the end of polymer chain is produced by reacting N-methylpyrrolidone with a block copolymer having the same styrene content and 1,2-vinyl content as in Example 3 obtained by polymerization in cyclohexane by use of n-butyl lithium as catalyst, before deactivation. An adhesive composition is produced in the same manner as in Example 3, except that said terminally modified block copolymer is used in place of the block copolymer used in Example 3. Performance characteristics of the adhesive composition are evaluated to find that it had a ball tack of 21, an adhesive strength of 900 g/cm and a creep resistance of 215 minutes. Thus, the creep resistance, in particular, is improved by the employment of the terminally modified block copolymer.

What is claimed is:

1. An adhesive composition comprising 100 parts by weight of a block copolymer (a) consisting of at least one polymer block composed mainly of a vinyl aromatic hydrocarbon and at least one polymer block composed mainly of butadiene in which
   (i) the vinyl aromatic hydrocarbon content [S] is 10 to 30% by weight,
   (ii) the 1,2-vinyl content of butadiene portion [V] is 20 to 50%, and
   (iii) the relationship between said vinyl aromatic hydrocarbon content [S] and said 1,2-vinyl content of butadiene portion [V] satisfies the formula:

$$40 \leq [S] + [V] \leq 70$$

and 40 to 200 parts by weight of a tackifier (b).

2. The adhesive composition, according to claim 1, which further comprises
   0.05 to 5 parts by weight, per 100 parts by weight of said block copolymer (a), of at least one member of a phenolic compound (c) represented by the general formulas [I] and [II] selected from the group consisting of

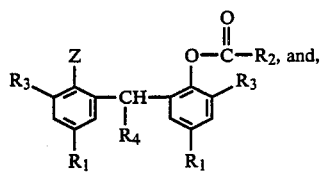

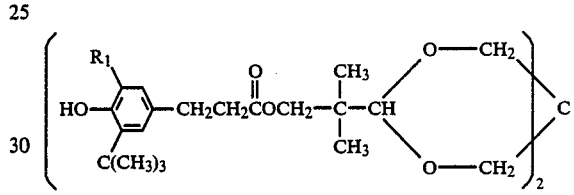

wherein Z is OH or

$R_1$ is an alkyl group having 1 to 4 carbon atoms, $R_2$ is an alkenyl group having 2 to 4 carbon atoms, $R_3$ is a tert-buytyl group or a cyclohexyl group, and $R_4$ is a hydrogen atom or an alkyl group having 1 to 18 carbon atoms.

3. The adhesive composition, according to claim 2, which further comprises
   0.05 to 5 parts by weight of a sulfur-containing stabilizer (d) per 100 parts by weight of said block copolymer (a).

4. The adhesive composition according to claim 1, wherein component (a) is a block copolymer in which the vinyl aromatic hydrocarbon content [S] is 15 to 25% by weight, the 1,2-vinyl content of butadiene portion [V] is 25 to 45%, and the relationship between [S] and [V] satisfies the formula.

$$45 \leq [S] + [V] \leq 60$$

5. The adhesive composition according to claim 1, wherein the vinyl aromatic hydrocarbon is at least one member selected from the group consisting of styrene, p-methylstyrene and α-methylstyrene.

6. An adhesive composition according to claim 1, wherein the tackifier is at least one member selected from the group consisting of terpene resin, aromatic-compound-modified terpene resin, alicyclic saturated petroleum resin, rosin ester, disproportionated rosin ester, completely hydrogenated rosin ester, aliphatic petroleum resin, and modified aliphatic petroleum resin.

7. The adhesive composition according to claims 2 or 3, wherein the phenolic compound represented by the above general formula [I] is at least one member selected from the group consisting of 2,2'-methylene-bis-(4-methyl-6-tertbutylphenol) monoacrylate, 2,2'-methylenebis-(4,6-di-tert-butylphenol) monoacrylate, 2,2'-ethylidene-bis-(4,6-di-tert-butylphenol) monoacrylate, 2,2'-methylene-bis-(4-methyl-6-tert-butylphenol) diacrylate, 2,2'-methylene-bis-(4,6-di-tert-butylphenol) diacrylate, and 2,2'-ethylidene-bis-(4,6-di-tert-butylphenol) diacrylate.

8. The adhesive composition according to claims 2 or 3, wherein the phenolic compound represented by the above general formula [II] is at least one member selected from the group consisting of 3,9-bis-[2-{3-(3-tert-butyl-4-hydroxy-5-methylphenyl)propionyloxy}-1,1-dimethylethyl]-2,4,8,10-tetraoxaspiro[5.5]undecane and 3,9-bis-[2-{3-(3-tert-butyl-4-hydroxy-5-isopropylphenyl)propionyloxy}-1,1-dimethylethyl]-2,4,8,10-tetraoxaspiro[5.5]undecane.

9. The adhesive composition according to claim 3, wherein the sulfur-containing stabilizer is at least one member of a compound represented by the general formulae [III] and [IV] selected from the group consisting of $(R_5SCH_2CH_2COOCH_2)_4C$, and [III]

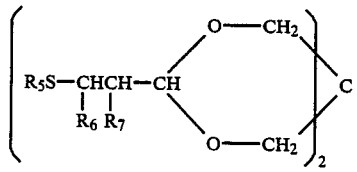   [IV]

wherein $R_5$ is an alkyl group having 3 to 20 carbon atoms, and each of $R_6$ and $R_7$ is a hydrogen atom or an alkyl group having 1 to 18 carbon atoms.

10. The adhesive composition according to claim 9, wherein the sulfur-containing stabilizer represented by the above general formula [III] is pentaerythritoltetrabis)-3-dodecylthiopropionate).

11. The adhesive composition according to claim 9, wherein the sulfur-containing stabilizer represented by the above general formula [IV] is at least one member selected from the group consisting of 3,9-bis-(2-dodecylthioethyl)- 2,4,8,10-tetraoxaspiro[5.5]undecane and 3,9-bis-(2-octadecylthiopropyl)-2-4,8,10-tetraoxaspiro-[5.5]undecane.

12. The adhesive composition according to claims 1, 2 or 3, which further contains, as coponent (e), a phenolic component represented by the following general formulae [V], [VI], [VII] and [VIII] in an amount of 0.05 to 5 parts by weight per 100 parts by weight of the block copolymer as component (a):

component (e) selected from

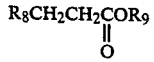   [V]

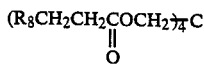   [VI]

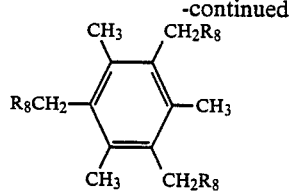   [VII]

or,

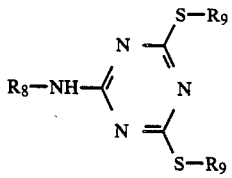   [VIII]

wherein $R_8$ is

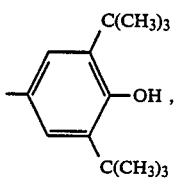

and $R_9$ is an alkyl group having 2 to 22 carbon atoms.

13. The adhesive composition according to claim 12, wherein the phenolic compound represented by the general formula [V] is n-octadecyl-3-(3',5'-di-tert-butyl-4'-hydroxyphenyl) propionate.

14. The adhesive composition according to claim 12, wherein the phenolic compound represented by the general formula [VI] is tetrakis-[methylene-3-(3',5'-di-tert-butyl-4'-hydroxyphenyl) propionate]methane.

15. The adhesive composition according to claim 12, wherein the phenolic compound represented by the general formula [VII] is 1,3,5-trimethyl-2,4,6-tris(3,5-di-tert-butyl-4-hydroxybenzyl)benzene.

16. The adhesive composition according to claim 12, wherein the phenolic compound represented by the general formula [VIII] is 2,4-bis-(n-octylthio)-6-(4-hydroxy-3,5-di-tert-butylanilino)-1,3,5-triazine.

17. The adhesive composition according to claims 1, 2 or 3, which further contains a phosphourus-containing stabilizer in an amount of 0.05 to 5 parts by weight per 100 parts by weight of said block copolymer (a).

18. The adhesive composition according to claim 17, wherein the phosphorus-containing stabilizer is at least one member selected from the group consisting of tris-(nonylphenyl) phosphite, cyclic neopentanetetraylbis-(octadecylphosphite), tris(2,4-di-tert-butylphenyl)-phosphite, 4,4-butylidene-bis(3-methyl-6-tert-bytylphenyl-di-tridecyl) phosphite, tetrakis(2,4-di-tert-butylphenyl) 4,4-biphenylenediphosphinate and cyclic neopentanetetrayl-bis-(2,4-di-tert-butylphenyl)phosphite.

19. The adhesive composition according to claim 1, which further contains a softener (component (f)) in an amount of 5 to 150 parts by weight per 100 parts by weight of the block copolymer (a).

20. A process for producing an adhesive composition which comprises blending 100 parts by weight of a block copolymer (a) consisting of at least one polymer block composed mainly of a vinyl aromatic hydrocarbon and at least one polymer block composed mainly of butadiene in which (i) the vinyl aromatic hydrocarbon content (S) is 10 to 30% by weight,
(ii) the 1,2-vinyl contnt of butadiene portion (V) is 20 to 50%, and
(iii) the relationship between said vinyl aromatic hydrocarbon content (S) and said 1,2-vinyl content of butadiene portion (V) satisfying the formula:

$$40 \leq (S)+(V) \leq 70$$

with 40 to 200 parts by weight of a tackifier (b).

21. The adhesive composition according to claim 12, which further contains a phosphorus-containing stabilizer in an amount of 0.05 to 5 parts by weight per 100 parts by weight of said block copolymer (a).

22. The adhesive composition according to claim 12, which further contains a softener (component (f)) in an amount of 5 to 150 parts by weight per 100 parts by weight of the block copolymer (a).

* * * * *